United States Patent
Fang et al.

(10) Patent No.: US 7,877,469 B2
(45) Date of Patent: Jan. 25, 2011

(54) AUTHENTICATION AND AUTHORIZATION FOR SIMPLE NETWORK MANAGEMENT PROTOCOL (SNMP)

(75) Inventors: Scott Fang, Plano, TX (US); Kong Posh Bhat, Plano, TX (US); Gary Parks, Mesquite, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1298 days.

(21) Appl. No.: 11/345,547

(22) Filed: Feb. 1, 2006

(65) Prior Publication Data

US 2007/0180086 A1 Aug. 2, 2007

(51) Int. Cl.
*G06F 15/173* (2006.01)
(52) U.S. Cl. .................. 709/223; 709/221; 709/224
(58) Field of Classification Search .......... 709/223, 709/221, 224
See application file for complete search history.

(56) References Cited

U.S. PATENT DOCUMENTS

| | | | | |
|---|---|---|---|---|
| 6,044,468 | A * | 3/2000 | Osmond | 726/5 |
| 6,286,040 | B1 * | 9/2001 | Durham et al. | 709/221 |
| 6,360,258 | B1 * | 3/2002 | LeBlanc | 709/223 |
| 6,795,862 | B1 * | 9/2004 | Keohane et al. | 709/230 |
| 6,820,124 | B1 | 11/2004 | Clough | |
| 7,024,556 | B1 * | 4/2006 | Hadjinikitas et al. | 713/168 |
| 2002/0107978 | A1 * | 8/2002 | Covelli et al. | 709/238 |
| 2005/0076206 | A1 | 4/2005 | Javanainen | |
| 2005/0198323 | A1 | 9/2005 | Ramaswamy et al. | |
| 2007/0079384 | A1 * | 4/2007 | Grinstein | 726/27 |

FOREIGN PATENT DOCUMENTS

| | | |
|---|---|---|
| CN | 1581795 A | 2/2005 |
| EP | 1126663 A2 | 8/2001 |
| JP | 2000134203 A * | 5/2000 |
| JP | 2003271476 A * | 9/2003 |
| KR | 1020030060598 A | 7/2003 |
| KR | 10-2004-0046882 | 6/2004 |
| KR | 1020050064105 A | 6/2005 |
| KR | 10-2006-0065455 | 6/2006 |
| KR | 1020060084045 A | 7/2006 |
| WO | WO 01/24444 A2 | 4/2001 |

OTHER PUBLICATIONS

Wu, S.F. Mazumdar, S. Brady, S. EMOSY: an SNMP protocol object generator for the protocol independent MIB, Apr. 14-16, 1993, IEEE, pp. 133-144.*

(Continued)

*Primary Examiner*—Wing F Chan
*Assistant Examiner*—Hitesh Patel

(57) ABSTRACT

A system is provided that includes a manager device that executes a Simple Network Management Protocol (SNMP) manager. The system also includes an agent device coupled to the manager device. The agent device executes a SNMP agent that selectively provides access to managed data. The SNMP manager enables a user to issue a login command. The SNMP agent processes the login command and, if the user is authenticated, allows the user to access the managed data using a session identifier.

20 Claims, 5 Drawing Sheets

OTHER PUBLICATIONS

PCT/KR2007/000497; PCT International Search Report; Samsung Electronics Co. Ltd.; May 8, 2007; 3 pgs.

"Simple Network Management Protocol," Wikipedia, http://en.wikipedia.org/wiki/Simple_Network_Management_Protocol, Apr. 24, 2006, pp. 1-6.

"SNMP Version 2 (SNMPv2) Message Formats," The TCP/IP Guide, http://www.tcpipguide.com/free/t_SNMPVersion2SNMPv2MessageFormats-2.htm, Apr. 25, 2006, pp. 1-3.

"SNMP Version 3 (SNMPv3) Message Format," The TCP/IP Guide, http://www.tcpipguide.com/free/t_SNMPVersion3SNMPv3MessageFormat.htm, Apr. 25, 2006, pp. 1-5.

Korean Search and Examination Report; Korean Application No. 10-2007-0004899; Feb. 28, 2008; 4 pgs.

Blumenthal, U., et al., "User-based Security Model (USM) for Version 3 of the Simple Network Mangement Protocol (SNMPv3)"; IBM T. J. Watson Research; Jan. 1998; 76 pgs.

U. Blument, "RFC2274-User-based Security Model (USM) for version 3 of the Simple Network Management Protocol (SNMPv3)", Jan. 1, 1998, 81 pages.

Office Action dated Oct. 8, 2010 in connection with Chinese Patent Application No. 200780004241.1.

* cited by examiner

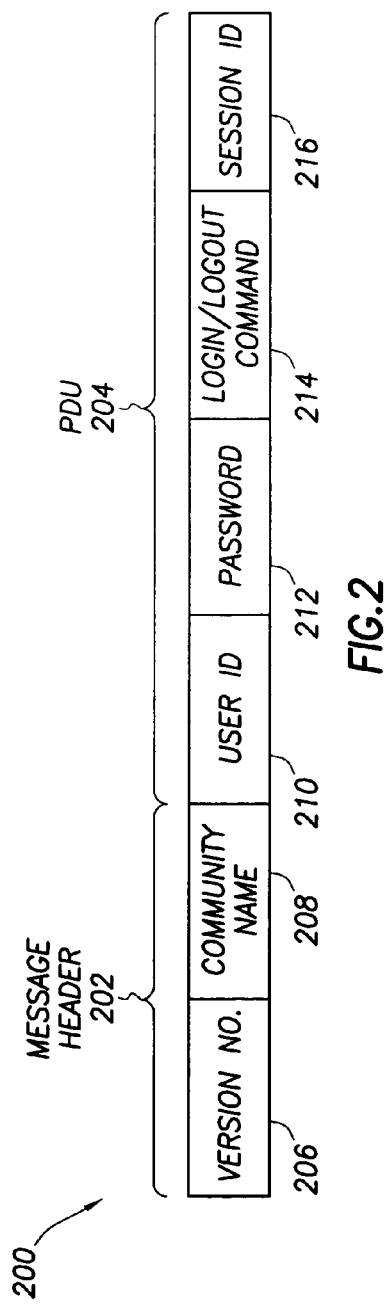

AUTHENTICATION AND AUTHORIZATION FOR SIMPLE NETWORK MANAGEMENT PROTOCOL (SNMP)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to authentication and authorization schemes, and more particularly, but not by way of limitation, to authentication and authorization schemes compatible with the Simple Network Management Protocol (SNMP).

BACKGROUND OF THE INVENTION

Simple Network Management Protocol (SNMP) is an application layer protocol that facilitates the exchange of management information between network devices. SNMP enables network administrators to manage network performance, find and solve network problems, and plan for network growth. In SNMP version 1 (SNMPv1) and SNMP version 2c (SNMPv2c) requests from authenticated communities are considered. Each community is associated with a community profile which indicates whether the community has, for example, read-only (RO) access rights or read-write (RW) access rights to managed data. The managed data is structured in accordance with a Management Information Base (MIB). In some case, the managed data may be referred to as MIB data.

Because the SNMP access rights are associated with the entire community, knowledge of the community name alone can give intruders access to the managed data. Furthermore, SNMP access rights are defined coarsely for the entire community (as either RO or RW) and apply uniformly to all objects in an MIB view.

SUMMARY OF THE INVENTION

In one embodiment, a system is provided that includes a manager device that executes a Simple Network Management Protocol (SNMP) manager. The system also comprises an agent device coupled to the manager device. The agent device executes a SNMP agent that selectively provides access to managed data. The SNMP manager enables a user to issue a login command. The SNMP agent processes the login command and, if the user is authenticated, allows the user to access the managed data using a session identifier.

In another embodiment, a data storage medium that stores a SNMP data packet is provided, the SNMP data packet includes a community name data field and a login command data field. The SNMP data packet further comprises a user identifier data field and a password data field. A login command contained in the login command data field causes a SNMP agent to ignore a value in the community name data field and to process values in the user identifier data field and the password data field for authentication In other embodiments, a method is provided that includes issuing a command using a Simple Network Management Protocol (SNMP) data packet. The method further comprises ignoring a SNMP community name and authenticating a user associated with the command.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2 illustrates a message packet in accordance with embodiments of the disclosure;

FIG. 3 illustrates a Management Information Base (MIB) login table in accordance with embodiments of the disclosure;

NOTATION AND NOMENCLATURE

Figure 1:
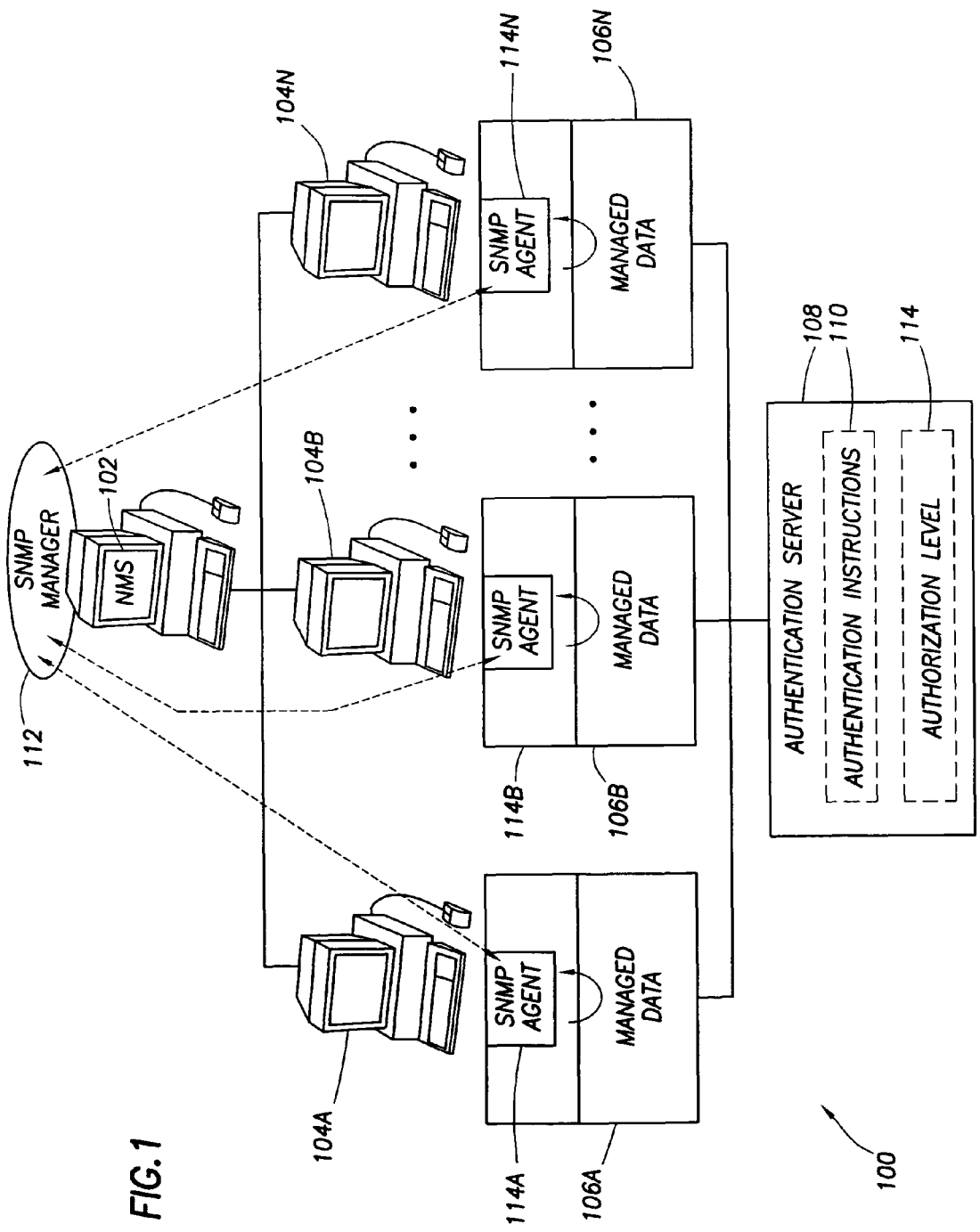
FIG. 1 illustrates a system in accordance with embodiments of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical, wireless, mechanical, or other connection or communication. Thus, if a first device couples to a second device, that connection may be, for example, through a direct electrical connection, through an indirect electrical connection via other devices and connections, through an optical electrical connection, or through a wireless electrical connection.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Simple Network Management Protocol (SNMP) provides a transaction-based mechanism to access or update managed data. It will be appreciated that SNMP is not a session based protocol. In accordance with some embodiments, a SNMP manager, a SNMP agent and an authentication server are configured to provide a virtual session to access or update the managed data. To implement the virtual session, embodiments of the disclosure provide a login scheme compatible with a Simple Network Management Protocol. The login scheme enables individual users to be authenticated rather than entire communities. Embodiments of the disclosure also enable different authorization levels to be associated with each individual user and/or each virtual session. The different authorization levels are based on local security policies (i.e., many different authorization levels could be devised based on the needs of the entity implementing SNMP). In at least some embodiments, the authorization levels enable a user to receive non-global access rights to available managed data (i.e., a user may be granted RO access rights to some managed data and RW access rights to other managed data). As used herein "non-global" access rights refer to access rights that only apply to some managed data, but not other managed data. Additionally or alternatively, the authorization level may enable a user to use some SNMP commands (e.g., a "get" command), but not other commands (e.g., "set" or "trap" commands). In an embodiment, some of the managed data may be structured as Management Information Base (MIB) tables.

FIG. 1 illustrates a system 100 in accordance with embodiments of the disclosure. As shown in FIG. 1, the system 100 comprises a managing device 102 (e.g., a computer) that couples to a plurality of agent devices 104A-104N. In at least some embodiments, the managing device 102 functions as a network management system (NMS) by executing, for example, a SNMP manager program 112. The SNMP manager program 112 enables a user to submit SNMP commands (e.g., a "Get" command, a "GetNext" command, a "Set" command, a "Trap" command or other SNMP commands) to the agent devices 104A-104N.

Each of the agent devices 104A-104N executes an SNMP agent program 114A-114N (e.g., the agent device 104A executes the SNMP agent program 114A, the agent device 104B executes the SNMP agent program 114B and so on) that enables the managing device 102 to access managed data 106A-106N, some of which may be conceptually structured in the form of MIB tables. As shown, the agent device 104A is associated with the managed data 106A, the agent device 104B is associated with the managed data 106B and so on. The managing device 102 and agent devices 104A-104N may be, for example, general purpose computer systems, which are discussed in greater detail below.

As a prerequisite to a user accessing or modifying the managed data 106A-106N, an authentication server 108 authenticates the user. For example, in some embodiments, executing authentication instructions 110 causes the authentication server 108 to authenticate a user identifier (ID) and password provided with a login command. Upon authenticating a user ID and password, the authentication instructions 110 associate a user with an authorization level. As previously mentioned, different authorization levels are based on local security policies. For example, one company may choose a first set of authorization levels for its users, while another company chooses a second set of authorization levels for its users. Examples of authorization levels include, but are not limited to, global RO access rights to available managed data, global RW access rights to available managed data, non-global RO access rights to available managed data, non-global RW access rights to available managed data, access to all SNMP commands, or access to some SNMP commands, but not other commands. The authorization levels may also be combined in any desired manner. For example, a write only (WO) authorization level might be added for some users. This may be useful for allowing unprivileged users to set an encryption password in write only memory but not read it, which would prevent others from trying to infer the details of the encryption algorithm in use.

As previously described, at least some embodiments implement a login scheme compatible with one or more versions of SNMP such as SNMP version 1 and SNMP version 2c. To implement the login scheme, an SNMP message packet is transmitted from the managing device 102 to one of the agent devices 104A-104N. For example, the SNMP manager program 112 may provide an appropriate application window that enables a user to enter data for login as well as to view or modify managed data after a successful login.

FIG. 2 illustrates a message packet 200 in accordance with embodiments of the disclosure. As shown in FIG. 2, the message packet 200 has a message header 202 and a protocol data unit (PDU) 204. The message header 202 includes a version data field 206 containing a SNMP version value (e.g., SNMP version 1 or SNMP version 2c) and a community name data field 208 containing a community name value. Note that some conventional components of an SNMP message may be omitted, for example the request type is omitted from the message header 202

The PDU 204 includes a user ID data field 210, a password data field 212, a login/logout command data field 214 and a user session ID data field 216. Each of the fields 210, 212, 214, and 216, may be composed, for example of an object identifier (OID) and an OID value. The user ID data field 210 contains a user ID value (e.g., a user name, a user number or other identifier) associated with a user. The password data field 212 contains a password associated with the user. The login/logout command data field 214 contains a value that is identified by the agent devices 104A-104N as a login command or a logout command. The user session ID data field 216 contains a user session identifier that is associated with all user commands after a successful login by a user.

Although login and logout commands could be submitted to any of the agent devices 104A-104N, the function of the agent device 104A upon receiving a login command is illustrated as an example. If a user issues a login command, the SNMP agent 114A of the agent device 104A ignores the community name value provided with the message packet 200 and forwards the user ID value and the password value provided with the login command to the authentication server 108 for authentication. The SNMP agent 114A of the agent device 104A also defines and manages a login table in its managed data 106A. Thus, when the agent device 104A receives a login command, the SNMP agent program 114A generates or updates an MIB login table in the managed data 106A. Additionally or alternatively, the MIB login table could be updated based on the results of the user authentication.

FIG. 3 illustrates a MIB login table 300 in accordance with embodiments of the disclosure. As shown in FIG. 3, the login table 300 stores a list 312 of user IDs 314A-314N and a list 322 of corresponding passwords 324A-324N (i.e., the user ID 314A corresponds to the password 324A, the user ID 314B corresponds to the password 324B and so on). The table 300 is indexed using a list 302 of user session identifiers 304A-304N. For example, the user ID "user_1" 314A and its associated password "password_1" 324A are indexed by the user session identifier "session ID_1" 304A. In at least some embodiments, the login table 300 supports dynamic row creation and deletion. For example, the SNMP agent program 114A may implement "CreateAndWait" or "CreateAndGo" techniques to modify the rows of the login table 300. Dynamic row creation and deletion are well known in SNMP and are understood by those skilled in the art. In an embodiment, the login and session creation involve row creation in the MIB login table. Similarly, in an embodiment, the logout and session termination involve row deletion from the MIB login table.

When a row in the login table 300 is activated, the SNMP agent program 114A forwards the corresponding user ID and password to the authentication server 108, which could be locally or remotely located with respect to the agent device 104A. If a user is successfully authenticated, the authentication server 108 provides the user authorization level to the agent device 104A. The user is then able to issue SNMP requests to the agent device 104A based on the authorization level. In at least some embodiments, all subsequent requests from a user contain the session identifier in the community name data field (e.g., the community name data field 208). Any attempt (by a "logged in" user) to execute a command that is not authorized is rejected by the SNMP agent program 114A.

The SNMP agent program 114A continues to honor all requests from an authenticated community (i.e., the session ID) until logout occurs. Logout can be initiated by a user command or can be activated after a predetermined period of inactivity (e.g., 15 minutes). This may be accomplished by defining a global time out period or may be accomplished by adding another MIB variable, such as the time duration after which a login session should expire. This technique allows the system to time-out different users at different intervals, instead of having a global predetermined period of inactivity Regardless of the expiration case, the SNMP agent program 114A deletes the session ID corresponding to the logout command from the login table 300. All subsequent requests using the session ID as the community name are rejected until a successful re-login is completed.

The security of SNMP version 1 (SNMPv1) and SNMP version 2c (SNMPv2c) authentication can be increased if the community names are not transmitted in clear text. Accordingly, in some embodiments, the community name string is encrypted using a public key. For example, the public key may be derived from object identifiers (OIDs) provided in a SNMP message packet PDU (e.g., the PDU 204). In this manner, an intruder may be able to replay a validly issued SNMP command, but cannot issue any arbitrary or malicious commands by simply placing the correct value in the community name field.

Time can also be considered when computing a public key for encrypting the contents of the community name field. For example, the number of 15 minute intervals that have elapsed since "epoch" (Jan. 1, 1970) can be used to generate a public key for encrypting the community name field (in addition to the OIDs in the SNMP PDU). In such case, the encrypted community string will only be valid for a 15 minute interval and the potential for nuisance by an intruder will be limited accordingly.

Figure 4A:
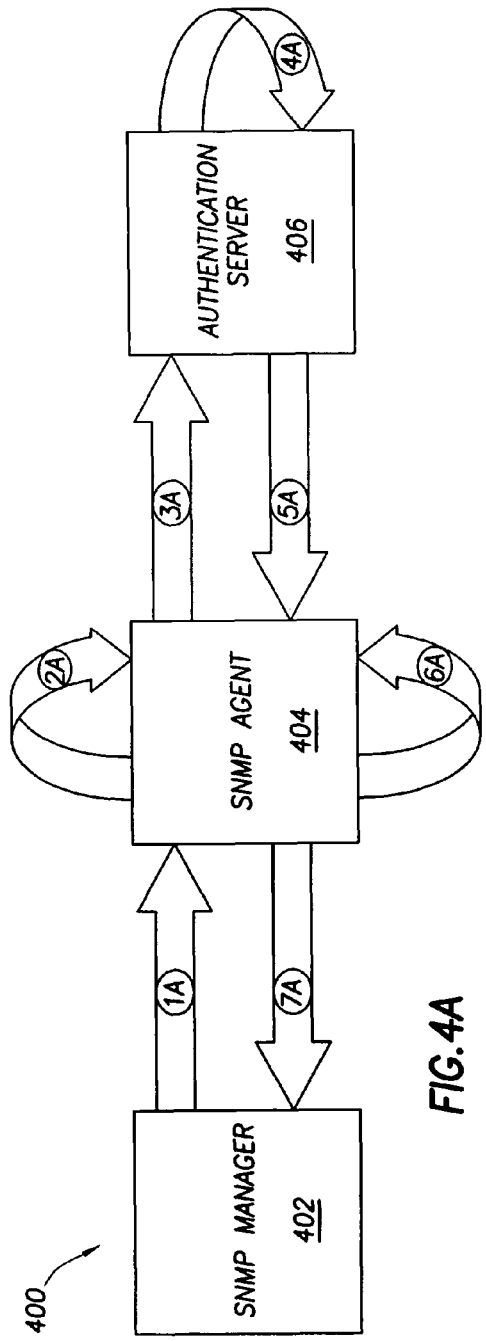
FIG. 4A illustrates a successful authentication process in accordance with embodiments of the disclosure.

FIG. 4A illustrates a successful authentication process 400 in accordance with embodiments of the disclosure. The process 400 is illustrated by the block arrows 1A-7A and shows the interaction between a SNMP manager 402, a SNMP agent 404 and an authentication server 406. First, the SNMP manager 402 issues a login command (arrow 1A). The SNMP agent 404 processes the login command (arrow 2A). In some embodiments, the login command causes the SNMP agent 404 to ignore the value in the community name data field of a SNMP packet (e.g., packet 200). The SNMP agent 404 forwards the user ID and password information provided with the login command to the authentication server 406 (arrow 3A). The authentication server 406 authenticates the user ID and password (arrow 4A). Upon successful authentication, the authentication server 406 provides an authorization level for the user to the SNMP agent 404 (arrow 5A). The SNMP agent 404 updates a list of logged-in users and keeps track of the authorization level for each user (arrow 6A). For example, an MIB login table can be created and updated to track logged-in users and authorization levels. Finally, the SNMP agent 404 sends a successful response to the SNMP manager 402 (arrow 7A).

Figure 4B:
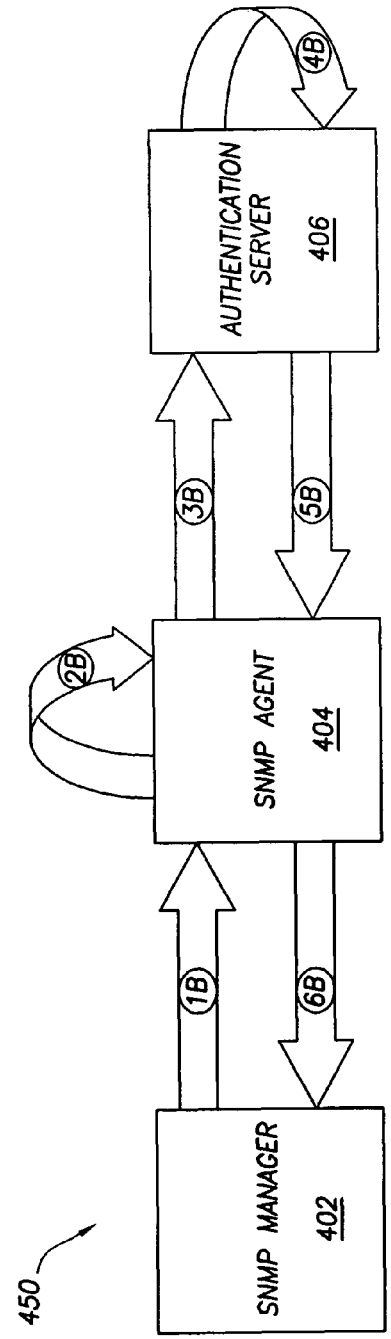
FIG. 4B illustrates a failed authentication process in accordance with embodiments of the disclosure.

FIG. 4B illustrates a failed authentication process 450 in accordance with embodiments of the disclosure. The process 450 is illustrated by the block arrows 1B-6B and shows the interaction between a SNMP manager 402, a SNMP agent 404 and an authentication server 406. First, the SNMP manager 402 issues a login command (arrow 1B). The SNMP agent 404 processes the login command (arrow 2B). In some embodiments, the login command causes the SNMP agent 404 to ignore the value in the community name data field of a SNMP packet (e.g., packet 200). The SNMP agent 404 forwards the user ID and password information provided with the login command to the authentication server 406 (arrow 3B). The authentication server 406 attempts to authenticate the user ID and password, but fails (arrow 4B). The authentication server 406 indicates to the SNMP agent 404 that the authentication failed or that the user does not have authorization to submit subsequent requests (arrow 5B). Finally, the SNMP agent 404 sends a failure response to the SNMP manager 402 (arrow 6B).

Figure 5:
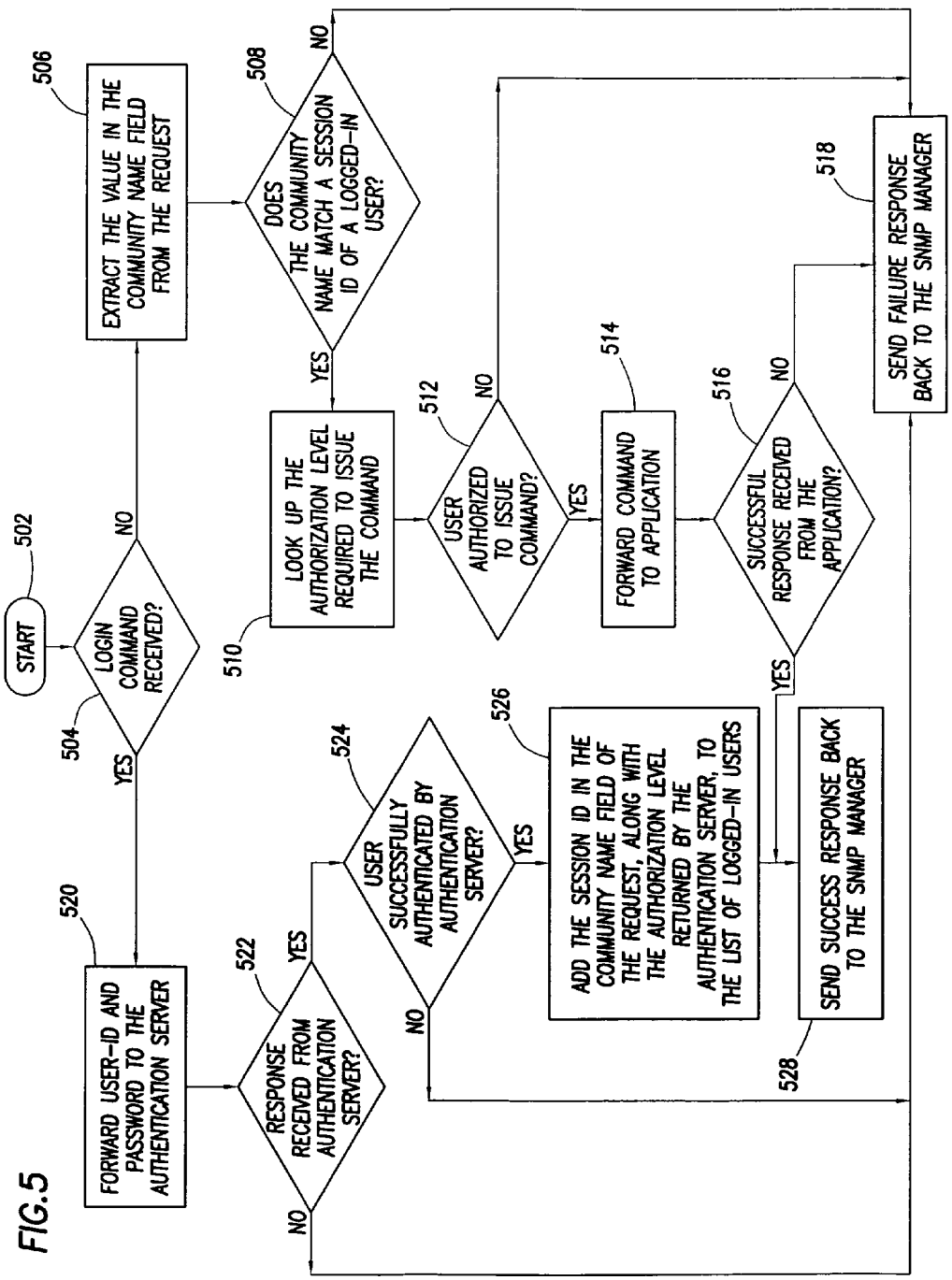
FIG. 5 illustrates a method in accordance with embodiments of the disclosure.

FIG. 5 illustrates a method 500 in accordance with embodiments of the disclosure. As shown in FIG. 5, the method starts at block 502. The method 500 then determines if a login command has been received (determination block 504). If a login command has been received (determination block 504), a user ID and password provided with the login command are forwarded to an authentication server (block 520). If a response is not received from the authentication server (determination block 522), a failure response is sent to the SNMP manager (518).

If a response is received from the authentication server (determination block 522), the method 500 determines if the authentication server successfully authenticated the user (determination block 524). If the authentication server did not successfully authenticate the user (determination block 524), a failure response is sent to the SNMP manager (block 518). If the authentication server successfully authenticates the user (determination block 524), a new logged-in user entry is added to a list of logged-in users (block 526). The entry contains the Session ID value, which is the value of the community name field in the SNMP request. The authorization level provided by the authentication server is also recorded in the list of logged-in users (block 526) (i.e., the list tracks each logged-in user and his/her corresponding authorization level). A success response is then sent to the SNMP manager (block 528).

Returning to block 504, if a login command is not received (determination block 504), the value in the community name data field is extracted from the SNMP request (block 506). In some embodiments, if a login command is not received, a SNMP command or request is received. If the community name does not match a session ID of a logged-in user (determination block 508), a failure response is sent to the SNMP manager (block 518). If the community name matches a session ID of a logged-in user (determination block 508), the method 500 looks up the authorization level of the logged-in user (block 510). If the logged-in user is not authorized to issue the received command (determination 512), a failure response is sent to the SNMP manager (block 518). If the logged-in user is authorized to issue the received command (determination block 512), the command is forwarded to the appropriate application (e.g., an SNMP agent that handles requests to access an MIB) (block 514). If the application that handles the command does not respond successfully (determination block 516), a failure response is sent to the SNMP manager (block 518). In some embodiments, a failure response sent to the SNMP manager for any of the above reasons may include an indicator identifying the cause of the failure. Alternatively, if the application that handles the command responds successfully (determination block 516), a success response is sent to the SNMP manager (block 528).

Figure 6:
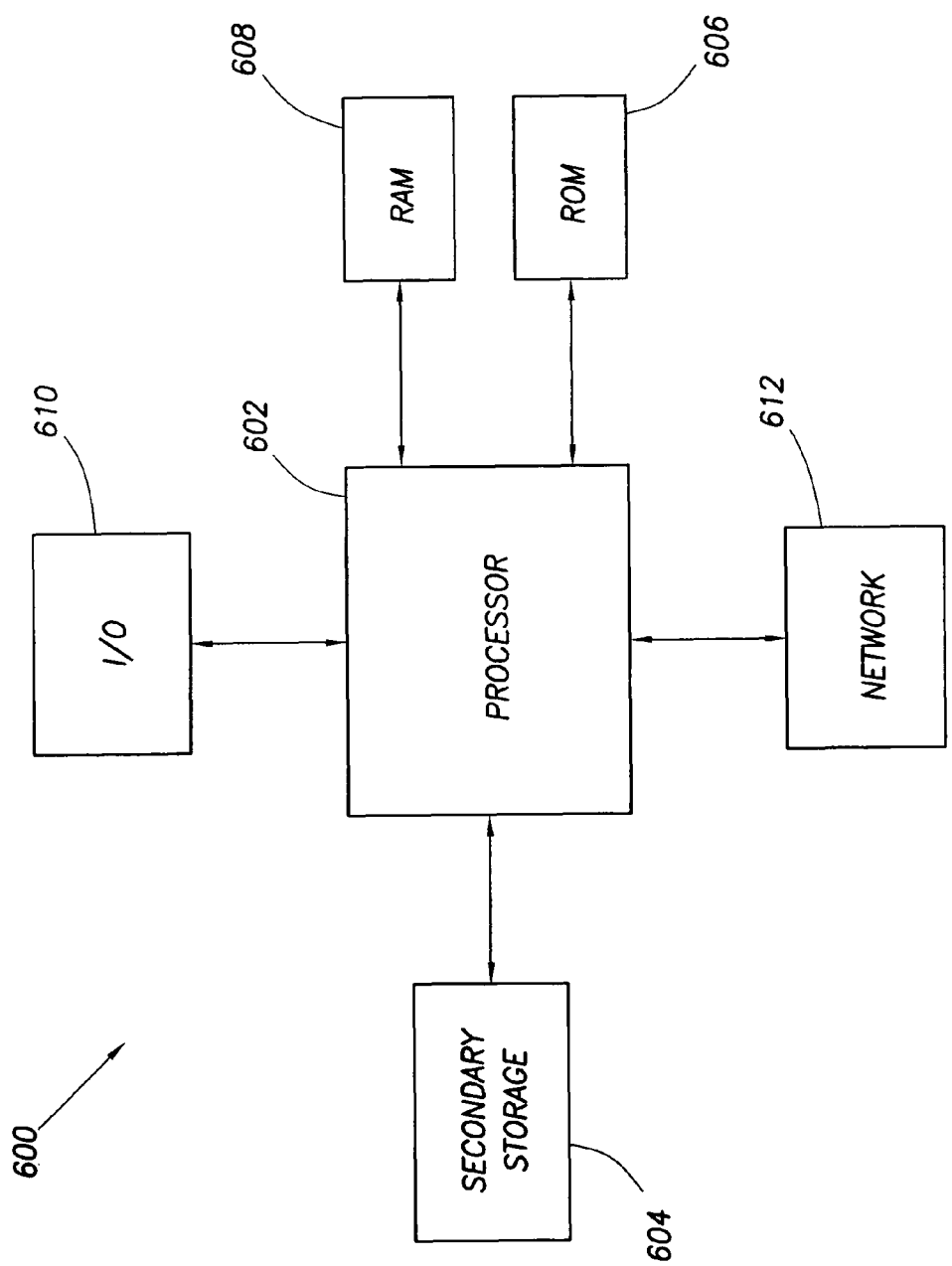
FIG. 6 illustrates a block diagram of a computer system suitable for implementing a SNMP manager, a SNMP agent, and/or an authentication server in accordance with embodiments of the disclosure.

The SNMP login system or portions of the system and method described above may be implemented on general-purpose computers having sufficient processing power, memory resources, and network throughput capability to handle the necessary workload placed upon it. FIG. 6 illustrates a block diagram of a computer system 600 suitable for implementing a SNMP manager, a SNMP agent, or an authentication server in accordance with embodiments of the disclosure. The computer system 600 includes a processor 602 (which may be referred to as a central processor unit or CPU) that is in communication with memory devices including secondary storage 604, read only memory (ROM) 606, random access memory (RAM) 608 (which in some embodiments may be non-volatile RAM or NVRAM), input/output (I/O) devices 610, and network connectivity devices 612. The processor may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution. Some SNMP agents may be installed in computer systems 600 that do not include secondary storage 604. The ROM 606 is used to store instructions and perhaps data which are read during program execution. In some embodiments, the ROM 606 is a non-volatile memory device which typically has a small memory capacity relative to the larger memory capacity of secondary storage. The RAM 608 is used to store volatile data and perhaps to store instructions. Access to both ROM 606 and RAM 608 is typically faster than to secondary storage 604.

The I/O devices 610 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 612 may take the form of modems, modem banks, ethernet cards, universal serial bus (USB) interface cards, serial interfaces, infra red (IR) interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 612 devices may enable the processor 602 to communicate with an Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave Such information, which may include data or instructions to be executed using processor 602 for example, may be received from and outputted to the network, for example, in the form of a computer data baseband signal or signal embodied in a carrier wave. The baseband signal or signal embodied in the carrier wave generated by the network connectivity 612 devices may propagate in or on the surface of electrical conductors, in coaxial cables, in waveguides, in optical media (e.g., optical fiber), or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 602 executes instructions, codes, computer programs, scripts which it accesses from hard disk, floppy disk, optical disk (these various disk based systems may all be considered secondary storage 604), ROM 606, RAM 608, or the network connectivity devices 612.

SNMP version 3 provides substantial security capabilities. For some devices, however, SNMP version 3 may require excessive processing. The above embodiments provide substantial utility by providing a novel authentication capability combined with multiple levels of access within the framework of standard SNMP version 1 and SNMP version 2c protocol communication.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system, comprising:
 a manager device configured to execute a Simple Network Management Protocol (SNMP) manager; and
 an agent device configured to execute a SNMP agent, the SNMP agent in communication with the SNMP manager and configured to selectively provide access including for the SNMP manager to managed data, wherein the SNMP manager is configured to issue an SNMP data packet comprising a login command, a community name, a user identifier and a password to the SNMP agent and wherein the SNMP agent is configured to processes the login command and, if the login command is authenticated, is configured to allow access to the managed data, and wherein the SNMP agent is configured to forward the user identifier and the password instead of the community name to an authentication server and wherein the authentication server is configured to attempt to authenticate a user based on the user identifier and the password instead of the community name.

2. The system of claim 1 wherein the SNMP agent is configured to access the managed data based on a session identifier contained in an SNMP message sent by the SNMP manager.

3. The system of claim 1 wherein the SNMP agent is configured to generate a table containing at least one user identifier and associated password, each user identifier and associated password being indexed by a separate session identifier.

4. The system of claim 1 wherein, if the user is authenticated, the authentication server is configured to provide an authorization level for the user to the SNMP agent.

5. The system of claim 4 wherein the SNMP agent is configured to track list of logged-in users and each user's authorization level.

6. The system of claim 4 wherein the authorization level provides non-global read-only (RO) access rights to the managed data.

7. The system of claim 4 wherein the authorization level provides non-global read-write (RW) access rights to the managed data.

8. The system of claim 4 wherein the authorization level restricts use of predetermined SNMP commands.

9. The system of claim 1 wherein, after logging-in, a subsequent request is permitted by placing the session identifier in a community name data field of the request.

10. A memory device that stores a Simple Network Management Protocol (SNMP) data packet issued by a SNMP manager executing on a managing device, the SNMP data packet comprising:
a community name data field;
a login command data field;
a user identifier data field; and
a password data field,
wherein a non-transitory login command contained in the login command data field causes a SNMP agent process values in the user identifier data field and the password data field for authentication instead of values in the community name data field.

11. The memory device of claim 10 wherein the SNMP data packet further comprises a session identifier data field and wherein, if the values in the user identifier data field and the password data field are authenticated, a valid session request is recognized by placing a value of the session identifier data field in the community name data field.

12. A method, comprising:
issuing, by a Simple Network Management Protocol (SNMP) manager, a command using a SNMP data packet, the SNMP data packet comprising:
a community name data field,
a login command data field,
a user identifier data field, and
a password data field; and
authenticating, by an authentication server, a user associated with the command based on values in the user identifier data field and the password data field instead of values the community name data field.

13. The method of claim 12 further comprising, if a user is authenticated, providing an authorization level for the user.

14. The method of claim 13 wherein providing an authorization level for the user comprises providing non-global access rights to managed data.

15. The method of claim 13 wherein providing an authorization level for the user comprises restricting user of at least one SNMP command.

16. The method of claim 12 further comprising updating a list of logged-in users and tracking an authorization level associated with each logged-in user.

17. The method of claim 12 further comprising, after a successful login, issuing a subsequent SNMP request by placing a session identifier in a community name data field of the request.

18. The method of claim 17 further comprising encrypting a value in the community name data field using a public key derived from object identifiers (OIDs) provided in a message packet protocol data unit (PDU).

19. The memory device of claim 10 wherein the SNMP agent is configured to generate a table containing at least one user identifier and associated password, each user identifier and associated password being indexed by a separate session identifier.

20. The memory device of claim 10 wherein, if a user is authenticated, the authentication server is configured to provide an authorization level for the user to the SNMP agent.

* * * * *